Oct. 22, 1968   HIROSHI KOBAYASHI ET AL   3,407,347
ASYMMETRICAL THREE-PHASE FERRO-RESONANCE DEVICE
Filed June 1, 1966   3 Sheets-Sheet 1

*INVENTORS*
*Hiroshi Kobayashi*
*Kiyoshi Hisano*

BY *Wenderoth, Lind and Ponack*
*attorneys*

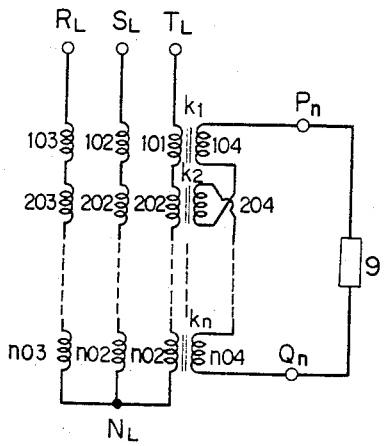
FIG. 2f
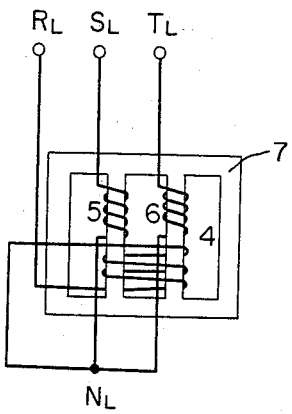
FIG. 2g
FIG. 3
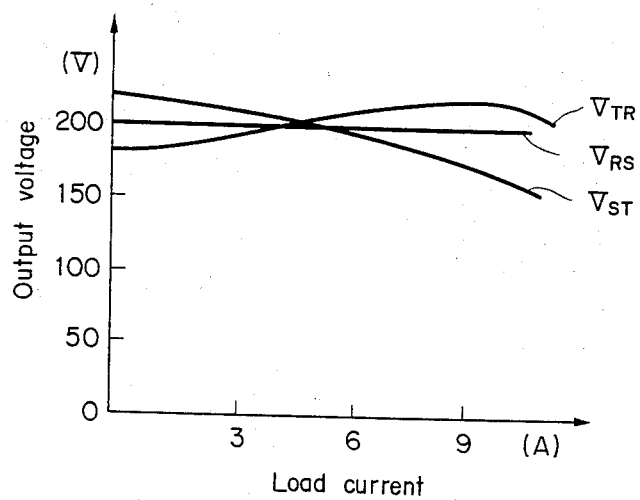

INVENTORS
Hiroshi Kobayashi
Kiyoshi Hisano

United States Patent Office 3,407,347
Patented Oct. 22, 1968

3,407,347
ASYMMETRICAL THREE-PHASE FERRO-RESONANCE DEVICE
Hiroshi Kobayashi and Kiyoshi Hisano, Tokyo, Japan, assignors to Yawata Iron & Steel Co., Ltd., Tokyo, Japan, a corporation of Japan
Filed June 1, 1966, Ser. No. 554,593
Claims priority, application Japan, June 3, 1965, 40/32,454
3 Claims. (Cl. 321—7)

ABSTRACT OF THE DISCLOSURE

An asymmetrical three-phase ferro-resonance device which can be used as a frequency converter or a frequency multipler. The device has a three-phase saturable reactor with star-connector primary windings which are electromagnetically coupled so that the vector sum of the voltages induced each phase is close to zero. The device has input terminals for a single-phase alternating voltage connected directly to the primary windings of two of the phases, and has a single capacitor resonating with the saturable reactor at the frequency of the single-phase voltage connected between the primary winding of the remaining phase of the saturable reactor and one of the primary windings of the said two phases. When the primary windings of the three-phases are connected to output terminals, a three-phase voltage can be taken therefrom, and when the saturable reactor is provided with secondary windings which are delta-connected, these windings can be tapped for a single-phase alternating voltage at a frequency which is a multiple of the input voltage frequency.

---

This invention is to provide a novel asymmetrical three-phase ferro-resonance device, which has as a first object to generate three-phase alternating electric power from a single-phase alternating current source and as a second object to generate multiplied frequency, by means of a simple arrangement.

In the attached drawings, FIG. 1 shows a circuit diagram of a basic embodiment of the present invention.

FIGS. 2a–2g show connection diagrams of various embodiments of a three-phase saturable reactor of the present invention.

FIG. 3 shows load characteristic curves obtained in the present invention.

Figure 1:
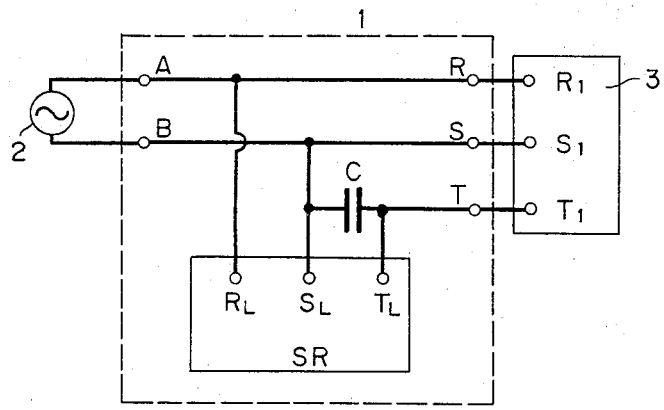

FIG. 1 illustrates one basic embodiment of the present invention, wherein 1 is an asymmetrical three-phase ferro-resonance device, 2 is a single-phase alternating current source, and 3 is the three-phase load. The single-phase alternating current source 2 is connected to the input terminals A and B of the asymmetrical three-phase ferro-resonance device 1, and the input terminals A and B are directly connected to the first and second output terminals R and S of the three-phase output terminals respectively. Further, one of the terminals of a capacitor C is connected to either one of the input terminals A or B (in the drawing there is shown the case in which it is connected to the input terminal B), and the other terminal of the capacitor C is connected to the third output terminal T. The output terminals R, S and T of the device are connected to the input terminals $R_L$, $S_L$ and $T_L$ of the corresponding phase of the three-phase saturable reactor SR respectively, as shown in FIGS. 2(a)–(g).

In an earlier patent application, now U.S. Patent 3,221,-243, of one of the present inventors, it was disclosed that three-phase output could be obtained from a single-phase input by a symmetrically constructed device in which capacitors are connected in parallel to each of the three saturable reactors in three resonant circuits, the capacitors and the saturable reactors being selected so as to resonate with each other.

The present invention is an improvement on the above device, and is very inexpensive and simple in its construction. It is called asymmetrical because only one capacitor is connected between two of the three saturable reactors. The capacitor C resonates with the saturable reactors with which it is connected.

Figure 2A:
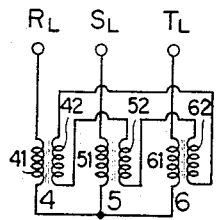
Figure 2B:
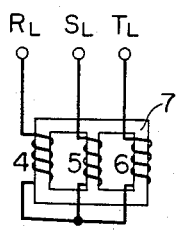

Although it cannot theoretically be explained why by the circuit arrangement shown in FIG. 1 the balanced three-phase output can be produced from the single-phase alternating current source, it was verified experimentally by the embodiments of the present invention. That is, for instance, in the embodiment where the three-phase saturable reactor SR in the circuit arrangement shown in FIG. 1 has a three-leg core construction as shown in FIG. 2(b), the excellent load characteristic as seen in FIG. 3 can be obtained. In the device which gave the load characteristics of FIG. 3, the three-phase saturable reactor had nearly same weight as an ordinary transformer with a capacity of approximately 2 kva., and the capacitor having a capacitance of 180μ F. was used as the capacitor C. From FIG. 3 is can be seen that it is possible to take out approximately 3.5 kva. of three-phase well balanced output. It was thoroughly verified through many experiments that substantially the same results can be obtained even when the three-phase saturable reactor is modified as shown in FIG. 2 (a)–(g).

Figure 2C:
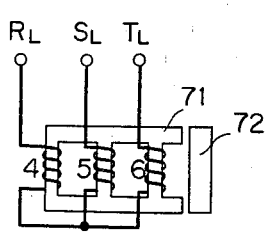
Figure 2D:
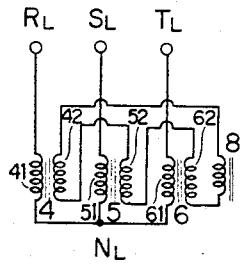
Figure 2E:
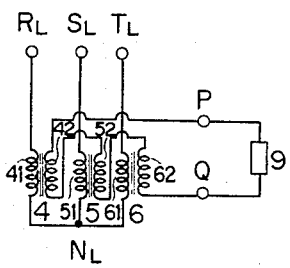

The construction of the three-phase saturable reactor in FIGS. 2(a)–(g) will now be described. FIG. 2(a) shows a reactor where respective primary windings 41, 51 and 61 of the three saturable reactors 4, 5 and 6 are star-connected, while secondary windings 42, 52 and 62 are delta-connected. FIG. 2(b) shows a reactor where the three saturable reactors 4, 5 and 6 are star-connected while each being wound on a respective leg of a three-leg core 7. FIG. 2(c) shows a reactor where a side-leg, that is, a fourth leg 72 is added to the same three-leg core 71 as shown in FIG. 2(b), with a small air-gap between the fourth leg 72 and the core 71. FIG. 2(d) shows a reactor where a linear reactor 8 is connected in series in the delta-connected circuit of the secondary windings of the same circuit arrangement as in FIG. 2(a) to obtain the same effect as is obtained by the side-leg 72 shown in FIG. 2(c). FIG. 2(e) shows a reactor wherein the delta-connected of secondary windings in the same circuit arrangement as of FIG. 2(a) include a load 9 connected across the output terminals P and Q, and an electric power having frequency of three times the source frequency is supplied to the load 9. In this case, the device works as a frequency multiplier, and the output terminals R, S and T are not needed.

A frequency multiplier for producing single-phase output from a three-phase voltage source is known, for example from U.S. Patent 3,264,549.

Because the device of the present invention can supply three-phase voltage from a single-phase voltage source, as described above, it can easily be understood that the device shown in FIG. 1 having the saturable reactor of FIG. 2(e) or FIG. 2(f) has the ability to act as a frequency multiplier supplying single-phase output from a single-phase voltage source. The three-phase voltage induced in the three-phase saturable reactor being used as the input voltage source for a frequency multiplier such as that shown in U.S. Patent 3,264,549. FIG. 2(f) shows a reactor very similar to that of U.S. Patent 3,264,549, wherein three sets of series-connected exciting windings 101–n01, 102–n02 and 103–n03 are star-connected, and those three sets of exciting windings are excited from the phases R, S and T of the electric source respectively, and the exciting windings 101, 102 and 103, for instance, are wound on the same core $k$, the exciting windings 201, 202 and 203 are wound on the same core, and so forth for the other exciting windings. Further windings 104–$n$04 are the output windings of the saturable reactors respectively and they are connected in series and with every other one in reverse polarity and are connected to the output terminals P$n$ and Q$n$, supplying electric power having frequency $n$ times the source frequency to the load 9, wherein $n$ is any odd number. In this case the device also works as a frequency multiplier multiplying the frequency $n$ times, and output terminals R, S and T are not needed. FIG. 2($g$) shows a reactor wherein two of the three saturable reactor windings are wound on two legs in the center of a four-leg core respectively, and the remaining saturable reactor winding is wound so as to interlink with the sum of the magnetic flux of the two legs in the center of the said four-leg core. In all the above-described reactor of FIGS. 2($a$)–($g$), the basic principle is that each phase of the three-phase saturable reactor is coupled electrically (FIG. 2($a$), ($b$), ($c$) and ($f$)) or magnetically (FIG. 2($b$), ($c$) and ($g$)), viz., electromagnetically, so as to make the vector sum of voltages induced in each phase almost zero. Further, in all of FIGS. 2($a$)–($g$), the connection points of the input terminals $R_L$, $S_L$ and $T_L$ of the three-phase saturable reactor and each phase winding are shown as being the terminal of each phase winding for the sake of simplifying the drawings; however in a practical design it may also be possible to have the connection points at an intermediate point of each phase winding.

A modified embodiment of the present invention will now be described.

Figure 4:
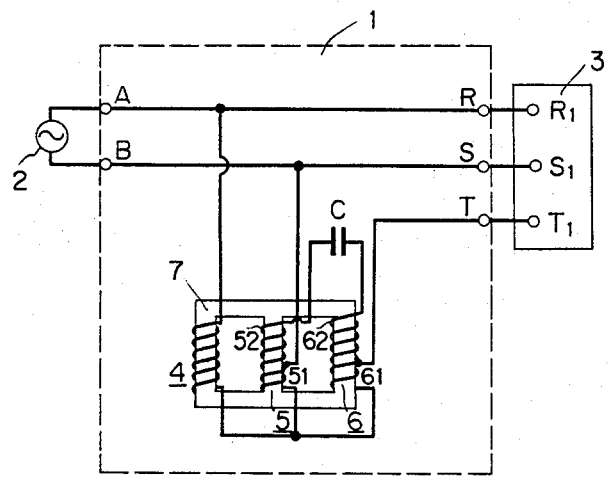
FIG. 4 and FIG. 5 show modified embodiments of the present invention.

When the voltage of the single-phase alternating current source 2 is as low as about 200 v., and when a three-leg core is used for the three-phase saturable reactor as shown in FIG. 4, the windings 5 and 6 of two phases out of the three phases of the saturable reactor are connected so as to be in an autotransformer structure and if the ratio of the number of times $n$ of the primary windings 51, 61 to the number of turns in the secondary windings 52, 62 is made large, the equivalent capacity seen from the output terminals S and T side of the capacitor C becomes $(1+n)^2$ times as much as its specific capacity. Consequently, the capacity of the capacitor can be made smaller in this embodiment.

Figure 5:
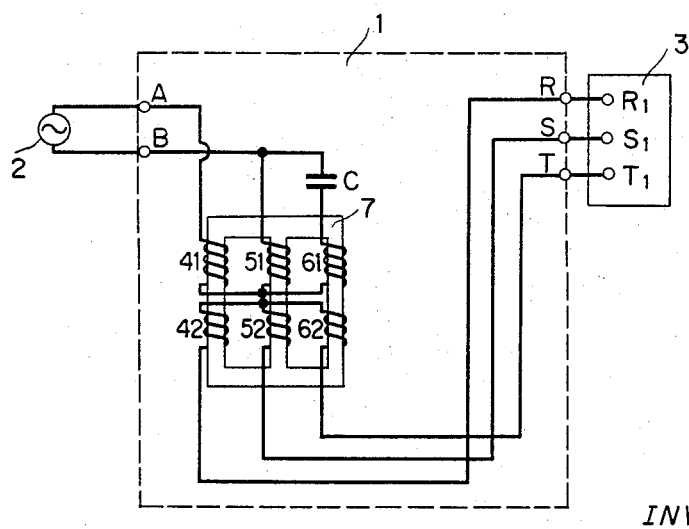

On the other hand, when the voltage of the single-phase alternating source 2 is as high as 6,600 v. or more while the required three-phase output voltage is as low as 200 v., the primary windings 41, 51, 61 and the secondary windings 42, 52, 62 can be applied to the respective phases of the three-phase saturable reactor as shown in FIG. 5, the primary windings to be used as the three-phase saturable reactor SR in FIG. 1, the secondary windings to be connected in star as shown in FIG. 5 (or delta) and these are connected to the output terminals R, S and T. And herein, one end of the capacitor C is connected to either one of the input terminals A or B, and the other end is connected to the primary winding 61 of the saturable reactor.

What is claimed is:

1. An asymmetrical three-phase ferro-resonance device comprising a three-phase saturable reactor having star-connected primary windings, each phase of said three-phase saturable reactor being electromagnetically coupled to the others for making the vector sum of the voltages induced in each phase close to zero, input terminals for a single-phase alternating voltage connected directly to the primary windings of two of the phases of the said three-phase saturable reactor, and a single capacitor resonating with said saturable reactor at the frequency of the single-phase voltage connected between the primary winding of the remaining phase of the saturable reactor and one of the primary windings of the said two phases of the said three-phases saturable reactor.

2. A device as claimed in claim 1 further comprising three output terminals, two output terminals being connected to corresponding input terminals and to the primary windings of said two phases of said saturable reactor, and the third output terminal connected to the primary winding of the third phase of the saturable reactor, whereby three-phase voltage induced in the primary windings of said saturable reactor is supplied at said output terminals.

3. A device as claimed in claim 1 in which said saturable reactor has delta-connected secondary windings for electromagnetically coupling the phases thereof, said delta-connected secondary windings having two output terminals in series, whereby two-phase voltage at a frequency which is a multiple of the frequency of said single-phase alternating voltage is supplied at said output terminals.

References Cited

UNITED STATES PATENTS

| | | | |
|---|---|---|---|
| 2,777,983 | 1/1957 | Kummel | 321—57 |
| 3,162,800 | 12/1964 | Friedlander et al. | 323—60 |
| 3,205,430 | 9/1965 | Tango et al. | 323—76 |
| 3,214,681 | 10/1965 | Tango et al. | 323—76 |
| 3,264,549 | 8/1966 | Biringer | 321—68 |

LEE T. HIX, *Primary Examiner.*

G. GOLDBERG, *Assistant Examiner.*